United States Patent [19]
Yamada

[11] Patent Number: 5,126,549
[45] Date of Patent: Jun. 30, 1992

[54] AUTOMATIC FOCUSING TELESCOPE

[75] Inventor: Kenji Yamada, Chiba, Japan

[73] Assignee: Nikon Corporation, Tokyo, Japan

[21] Appl. No.: 700,481

[22] Filed: May 15, 1991

[30] Foreign Application Priority Data

May 16, 1990 [JP] Japan .................................. 2-124031

[51] Int. Cl.⁵ .............................................. G01J 1/20
[52] U.S. Cl. .................................. 250/201.2; 359/407
[58] Field of Search ........................ 250/201.2, 201.3;
  359/380, 407, 409, 410, 414, 416, 417, 418, 425,
  426, 431, 480, 698, 705, 831, 832, 833–837

[56] References Cited

U.S. PATENT DOCUMENTS

| | | | |
|---|---|---|---|
| 3,069,972 | 12/1962 | Tibbetts et al. | 359/418 |
| 3,645,602 | 2/1972 | Clave et al. | 359/407 |
| 4,293,187 | 10/1981 | Ishibai | 350/36 |
| 4,687,913 | 8/1987 | Chaban | 350/201.3 |
| 5,005,040 | 4/1991 | Norita et al. | 250/201.2 |

Primary Examiner—David C. Nelms
Assistant Examiner—T. Davenport
Attorney, Agent, or Firm—Michael N. Meller

[57] ABSTRACT

An automatic focusing telescope capable of automatic focusing. This automatic focusing telescope includes object lens means for forming an inverted image of an object, ocular lens means for observing the image formed by the object lens means, erect prism means having a plurality of reflective surfaces and arranged between the object lens means and the image of the object to erect the inverted image, semitransparent surface means formed on one of the plurality of reflective surfaces of the erect prism means to branch the light ray from the object lens means into a transmitted light path and a reflected light path, auxilary prism means arranged on the transmitted light path from the semitransparent surface means and having an exit surface perpendicular to the transmitted light path, focal point detecting means for receiving the image of the object formed in one of the light paths branched from the semitransparent surface means to detect the focal point thereof, and drive means responsive to a signal from the focal point detecting means to move at least one of the object lens means and the ocular lens means to adjust the focal point.

8 Claims, 5 Drawing Sheets

AUTOMATIC FOCUSING TELESCOPE

BACKGROUND OF THE INVENTION

1. Field of the Invention

The present invention relates to an automatic focusing telescope capable of automatic focusing.

2. Description of the Prior Art

Known automatic focusing telescopes include for example one disclosed in U.S. Pat. No. 4,293,187.

In an example of binoculars disclosed in FIG. 1 of this publication, the light ray from an objective lens is divided into a transmitted light ray and a reflected light ray by a semitransparent reflecting mirror composed of a plane-parallel plate so that the transmitted light ray is used as an observation light ray and the reflected light ray is used as a focal point detecting light ray. The transmitted light ray forms an erect image through an erect prism system so that this erect image is expanded and provided for observation by an ocular lens. On the other hand, the reflected light ray from the semitransparent reflecting mirror is directed toward an automatic focusing module so that in accordance with a detection signal of the automatic focusing module, the ocular lens is moved so as to bring the forward focal surface of the ocular lens into coincidence with the focal surface position of the objective lens, thereby effecting the focusing.

Also, in the example shown in FIG. 2 of the above-mentioned U.S. Pat. No. 4,293,187, the light ray from an objective lens is divided into a transmitted light ray and a reflected light ray at a semitransparent reflecting surface provided on an erect prism system so that the branched transmitted light ray is directed to an automatic focusing module.

With the above-mentioned conventional automatic focusing telescope, however, if the plane-parallel plate (the semitransparent reflecting mirror) is arranged midway in an imaging system for the purpose of branching the light ray to the automatic focusing module, the plane-parallel plate is arranged obliquely with respect to the optical axis thus giving rise to a serious problem that a considerable astigmatism is caused to the transmitted light ray thereby making it impossible to observe a sharp image. This problem is particularly manifested in such case where the focal length of the ocular lens is reduced in an attempt to increase the magnification.

On the other hand, where the light ray is divided by the semitransparent reflecting surface formed on the erect prism system without using the plane-parallel plate, the transmitted light ray is naturally refracted greatly. In the case of FIG. 2 in the previously mentioned U.S. Pat. No. 4,293,187, the reflected light ray from the semitransparent reflecting surface is used as a light ray for observation purpose thus causing no problem as astigmatism in the observation system, whereas in the automatic focusing system using the transmitted light ray a considerable astigmatism is caused and the automatic focusing accuracy is deteriorated considerably.

SUMMARY OF THE INVENTION

The present invention has been made in view of these circumstances and it is an object of the present invention to provide an automatic focusing telescope capable of avoiding the occurrence of an astigmatism in either of an observation system and a focal point detecting system and producing a sharp observation image.

The automatic focusing telescope according to the present invention comprises the following elements including object lens means for converging the light ray from an object to form an inverted image of the object, ocular lens means for observing the image formed by the object lens means, erect prism means having a plurality of reflecting surfaces and arranged between the object lens means and the said image of the object to erect the said inverted image, semitransparent surface means formed on one of the plurality of reflecting surfaces of the erect prism means for branching the light ray from the object lens means into a transmitted light path and a reflected light path, auxiliary prism means arranged on the transmitted light path from the semitransparent surface means and having an exit surface which is perpendicular to the transmitted light path, focal point detecting means for receiving an image of the object formed in one of the paths of the light ray branched by the semitransparent surface means to detect the focal point, and drive means responsive to the signal from the focal point detecting means to move at least one of the object lens means and the ocular lens means.

In the automatic focusing telescope of the present invention, the light ray from the object lens means is divided into a transmitted light ray and a reflected light ray by the semitransparent surface means formed on the erect prism means arranged in the light path of the observation system. While the semitransparent surface means is inclined with respect to the optical axis, in accordance with the present invention the auxiliary prism means is connected to the semitransparent surface means so that there is no danger of the light ray being refracted unsymmetrically relative to the optical axis when passing through the semitransparent surface means. In addition, since the exit surface of the auxiliary prism means is formed to be perpendicular to the optical axis, there is no danger of the transmitted light ray being refracted unsymmetrically with respect to the optical axis when emitted from the auxiliary prism means. As a result, in accordance with the present invention the light ray can be branched without causing any astigmatism to the transmitted light ray. At this time, in order to avoid more completely any refraction of the light ray at the boundary surface between the errect prism means and the auxiliary prism means, the errect prism means and the auxiliary prism means should preferably be made of glass materials having the same refractive index.

The above and other features and advantages of the present invention will become more readily apparent from the following description of its embodiments taken in conjunction with the accompanying drawings.

DESCRIPTION OF THE PREFERRED EMBODIMENTS

Embodiment 1

Figure 1:
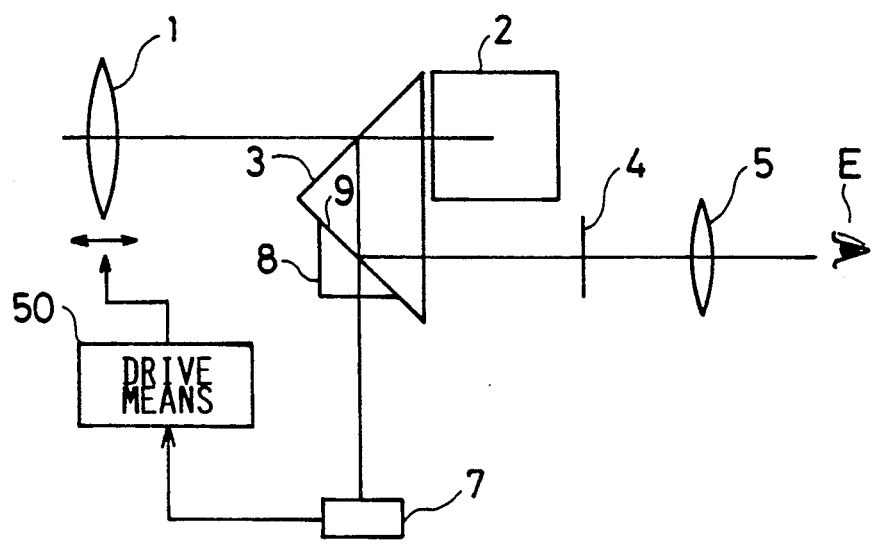
FIG. 1 is an optical path diagram showing the construction of a first embodiment of the present invention.

Referring to FIG. 1, there is illustrated an optical path showing the construction of a principle part of a telescope according to a first embodiment of the present invention.

In the Figure, an observation system is composed of an object lens 1, an ocular lens 5, and a double Porro prism (erect prism system) including a first rectangular prism 2 and a second rectangular prism 3 and arranged between the object lens 1 and the ocular lens 5. In this case, the first and second rectangular prisms 2 and 3 are arranged in such a manner that their rectangular edge lines are positioned so as to be perpendicular to each other and at right angles to the optical axes. The second reflecting surface of the second rectangular prism 3 is formed on a semitransparent surface 9 and an auxiliary prism 8 consisting of a rectangular prism is arranged on the semitransparent surface 9 through an adhesive or a small gap in such a manner that its inclined surface faces the semitransparent surface 9. The inverted image by the object lens 1 is turned left for right and upside down by the double Porro prism and the light ray reflected from the semitransparent surface 9 forms an erect image 4 on the focal surface. This erect image 4 is magnified by the ocular lens 5 and observed by an observer E.

On the other hand, the light ray transmitted through the semitransparent surface 9 is directed as a focal point detecting light ray through the auxiliary prism 8 to a focal point detecting unit 7 arranged at a position which is optically equivalent to the erect image 4. The focal point detecting unit 7 detects a signal which varies in accordance with the distance of the object to be observed so that in accordance with this detection signal the object lens 1 is moved along the optical axis to realize the focusing by an electric circuit, a motor, etc., which are not shown in such a manner that the erect image 4 is always formed at a given position (that position which coincides with the forward focal surface of the ocular lens 5).

With the automatic focusing telescope constructed as described above, while the transmitted light ray from the semitransparent surface 9 is used as a focal point detecting light ray, the transmitted light ray is branched from the observation light path through the auxiliary prism 8 and therefore no astigmatism is caused in the focal point detecting system. Where the transmitted light ray from the semitransparent surface 9 is used as a focal point detecting light ray as in the case of the present embodiment, it is desirable to form the semitransparent surface 9 with a dichroic mirror so that the visible light ray is reflected and directed to the observation system and only the infrared light ray is transmitted through the semitransparent surface 9 and directed to the focal point detecting unit 7, thereby reducing the loss in the light quantity of the observation system to a minimum.

In the embodiment of FIG. 1, when the output signal from the focal point detecting unit 7 is applied to drive means 50, the object lens 1 is moved a given amount along the optical axis by the drive means 50 thereby effecting the focusing of the object. In order to effect the focusing, the ocular lens may be moved by a given amount along the optical axis instead of moving the object lens by the drive means.

Embodiment 2

Figure 2:
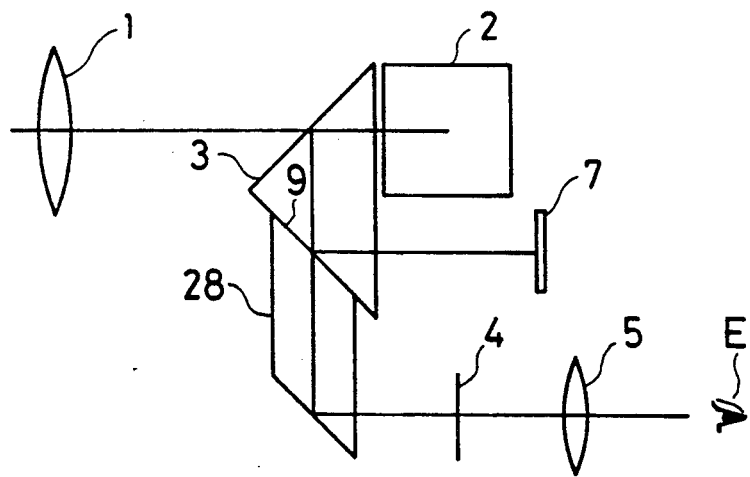
FIG. 2 is an optical path diagram showing the construction of a second embodiment of the present invention.

Referring to FIG. 2, there is illustrated an optical path diagram showing the construction of a principal part of an automatic focusing telescope according to a second embodiment of the present invention.

While, in the telescope of the second embodiment, the object lens 1 and the erect prism system are identical in construction as in the first embodiment, the second embodiment differs from the first embodiment in that the reflected light ray from the semitransparent surface 9 is directed as a focal point detecting light ray to the focal point detecting unit 7 and the transmitted light ray is directed as an observation light ray to the ocular lens 5.

In the Figure, connected to the semitransparent surface 9 formed on the second reflecting surface of the second rectangular prism 3 of the double Porro prism is an auxiliary prism 28 having a reflecting surface which is parallel to the semitransparent surface. The light ray transmitted through the semitransparent surface 9 is bent by 90 degrees through the auxiliary prism 28 so that the light ray is emitted from its surface perpendicular to the optical axis (in this embodiment the optical axes of the focal point detecting system and the observation system are parallel to each other) thereby forming an erect image 4 at the focal surface position. While, in the second embodiment, the transmitted light ray from the semitransparent surface is used as an observation light ray contrary to the first embodiment, by so doing, the occurrence of any astigmatism to the transmitted light ray can be avoided by the auxiliary prism 28 and thus there is no danger of deterioration in the definition of the erect image 4.

Embodiment 3

Figure 3:
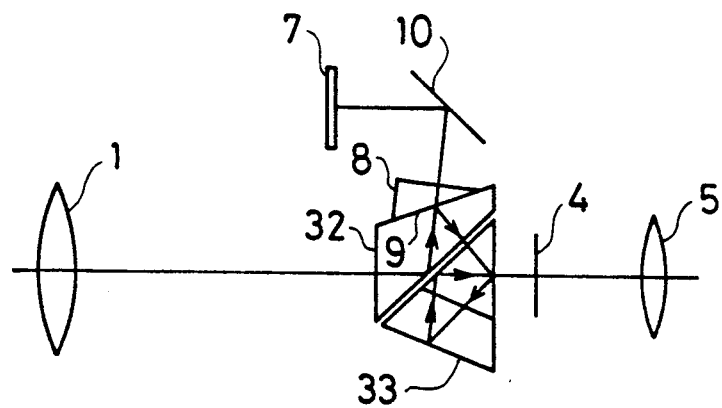
FIG. 3 is an optical path diagram showing the construction of a third embodiment of the present invention.

Referring to FIG. 3, there is illustrated an optical path diagram showing the construction of a principal part of a telescope according to a third embodiment of the present invention.

While, in each of the first and second embodiments, the double Porro prism is used as the erect prism system, in the third embodiment a pechan prism comprising a combination of a prism 32 and a roof prism 33 is used as the erect prism system. The second reflecting surface of the prism 32 is formed on the semitransparent surface 9 and the auxiliary prism 8 is connected to this second reflecting surface.

In FIG. 3, the light ray from the object lens 1 first enters the prism 32 so that the resulting reflected light ray from the semitransparent surface 9 is further reflected three times (four times if the reflection by the roof surface is included) within the roof prism 33 having roof-type reflecting surfaces crossing each other at an angle of 90 degrees and it is emitted at a right angle from the roof prism 33, thereby forming an erect image 4 at the focal surface position. On the other hand, the light ray transmitted through the semitransparent surface 9 is branched toward the focal point detecting system through the auxiliary prism 8, reflected by a reflecting mirror 10 and directed to the focal point detecting unit 7.

In the construction shown in FIG. 3, the optical axis leading to the erect prism system (the prism 32) from the object lens 1 of the observation system and the optical axis leading to the ocular lens 5 from the erect prism system (the roof prism 33) are in alignment and therefore the telescope can be made more compact.

Embodiment 4

Figure 4:
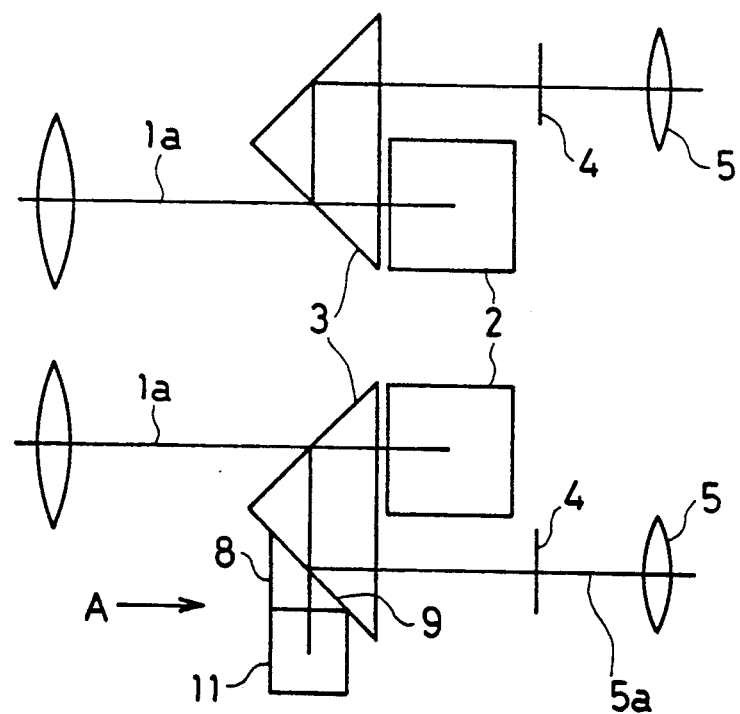
FIG. 4 is an optical path diagram showing the construction of a fourth embodiment of the present invention.

Referring to FIG. 4, there is illustrated an optical path diagram showing the construction of a principal part of a fourth embodiment of the present invention which is applied to binoculars.

In the binoculars shown in FIG. 4, a pair of observation optical systems of the similar construction as the observation system in the telescope of the first embodiment 1 are symmetrically arranged with object lenses 1 being positioned on the inner side and a focal point detecting system is provided in the optical system on the left side as looked from the side of ocular lenses 5. In each of the right and left optical systems, the light ray from the object lens 1 forms an erect image 4 on the focal surface through a so-called double Porro prism composed of a first rectangular prism 2 and a second rectangular prism 3 and this image is observed through the ocular lens 5.

Figure 5A:
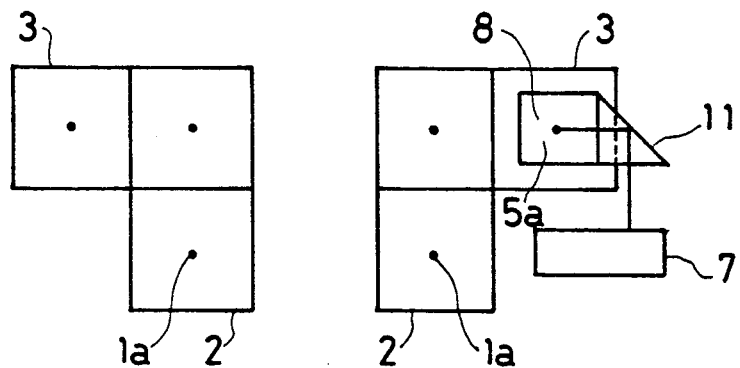
FIGS. 5A and 5B are diagrams showing respectively the observation optical system looked from the direction of an arrow A in conditions different from each other.

Referring now to FIG. 5A, the left-hand optical system including the focal point detecting system is shown as looked from the direction of the arrow A in FIG. 4. The second reflecting surface of the second rectangular prism 3 is formed on a semitransparent surface 9 so that a focal point detecting light ray is branched from the observation optical path through an auxiliary prism 8 connected to the second reflecting surface. This focal point detecting light ray is reflected in a direction perpendicular to the plane containing the two observation optical axes of the binocular (the paper plane in FIG. 4) by a reflective prism 11 connected to the auxiliary prism 8 and it is then directed to a focal point detecting unit 7. In the case of binoculars, it is necessary to provide a focal point detecting system in one of the right and left optical systems so that in accordance with a detection signal of the focal point detecting unit 7 both the right and left object lenses are simultaneously moved in the optical axis directions thereby accomplishing the focusing.

Figure 5B:
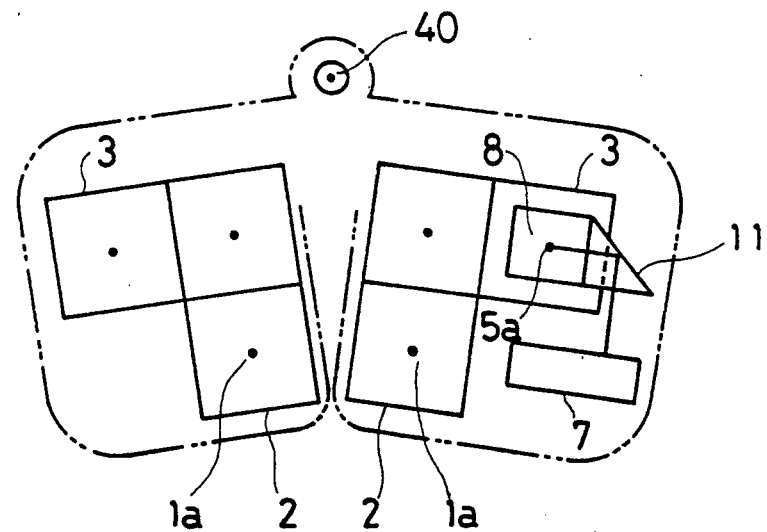

In the construction of the binoculars shown in FIGS. 4 and 5A, in order to adjust the spacing between the pair of right and left ocular lenses to the pupil distance of the observer, the right and left optical systems each including from the object lens to the ocular lens are arranged so as to be relatively rotatable with a shaft 40 parallel to the optical axes as a center of rotation as shown in FIG. 5B. Then, at this time the focal point detecting unit 7 is rotated as a unit with one of the telescope optical systems.

As shown in FIGS. 5A and 5B, the light ray arriving at the focal point detecting unit 7 is first passed through the auxiliary prism and then reflected at a right angle by the reflective prism 11, thus making it possible to arrange the focal point detecting unit 7 in the space between the object lens 1 and the rectanglar prisms 2 and 3 and thereby reducing the size of the binoculars on the whole.

In accordance with the construction shown in FIGS. 4, 5A and 5B, even after the optical systems have been assembled as the binoculars, the focal point detecting unit 7 can be adjusted easily and thus this construction is also advantageous from the manufacturing process point of view.

It is to be noted that while, in the case of FIG. 4, the focal point detecting light ray is bent downwardly of the optical system by the reflective prism 11, it is needless to say that the light ray can be suitably directed to a convenient place through a plurality of times of reflection.

Embodiment 5

Figure 6:
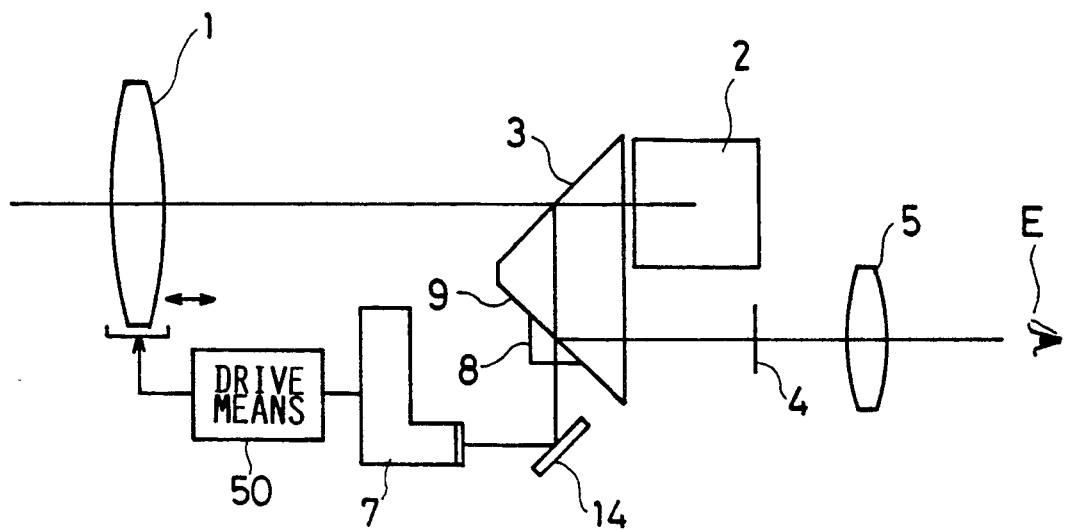
FIG. 6 is a diagram showing the construction of a telescope constituting a fifth embodiment of the invention.

Referring to FIG. 6, there is illustrated a schematic diagram showing the construction of a fifth embodiment in which a focal point detecting unit 7 is accommodated in a space between two rectangular prisms 2 and 3 forming an erect prism system and an object lens 1. In this embodiment, the final reflective surface of the erect prism system is formed on a semitransparent mirror 9 so that the light ray passed through an auxiliary prism 8 connected to the semitransparent mirror 9 is reflected toward the object lens 1 side by a reflecting mirror 14 and directed to the focal point detecting unit 7. The light ray from the object lens 1 is reflected twice by the first rectangular prism 2, then entered into the second rectangular prism 3 where it is reflected twice and condensed on a spatial image 4. Thus, the optical axis of an ocular lens 5, the reflecting mirror 14 and the focal point detecting unit 7 are arranged within the entrance surface (the paper plane of FIG. 6) of the second reflecting surface (semitransparent surface) of the rectangular prism 3. Since the focal point detecting unit 7 is arranged within the space between the object lens 1 and the rectangular prisms 2 and 3, the construction can be made smaller and more compact. This embodiment is the same as the previously mentioned embodiments in that drive means 50 is driven by the output signal from the focal point detecting unit 7 and the object lens 1 is moved a given amount along the optical axis, thereby effecting the focusing.

Figure 7:
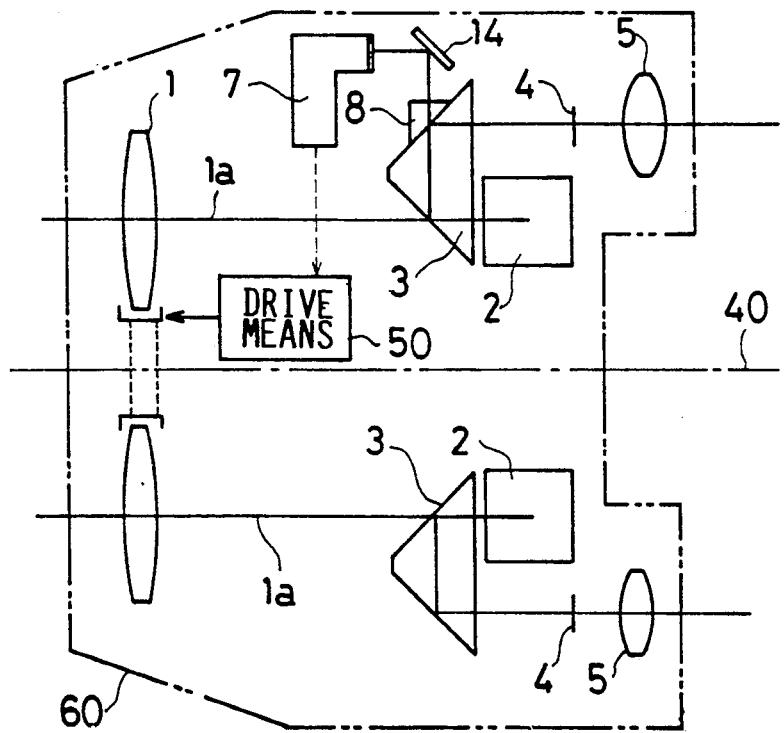
FIG. 7 is a diagram showing the construction of binoculars constituting a sixth embodiment of the invention.

Referring to FIG. 7, there is illustrated a plan view showing the construction of a sixth embodiment in which a pair of the telescopes shown in FIG. 6 is assembled as binoculars. The same component parts as used in the previously mentioned embodiments are designated by the same reference numerals.

In this binoculars, the focal point detecting unit 7 is arranged in the right-hand optical system of the pair of right and left telescopes. The arrangement of the focal point detecting unit 7 is substantially the same as the previously mentioned FIG. 6 and the construction can be made smaller and more compact than previously. Moreover, due to the arrangement of the focal point detecting unit on the outer side of the pair of right and left telescopes, the focal point detecting unit 7 can be subjected to fine adjustment at the final stage of the assembly adjustment and thus the actual manufacture can be made simpler and easier. Also in this embodiment the pair of right and left object lenses 1 is moved as a unit in the optical axis directions by the drive means 50 in accordance with the signal from the focal point detecting unit 7, thereby effecting the focusing.

It is to be noted that while there is no particular limitation to the focal point detecting unit 7 used in the telescopes according to the above-mentioned embodiments, it is possible to preferably use such detecting unit as disclosed in U.S. Pat. No. 4,561,749, for example. From the standpoint of simplifing the construction of the focal point detecting system, it is desirable to use a focal point detecting unit employing a solid-state image sensor and not including any mechanical moving parts.

Figure 8A:
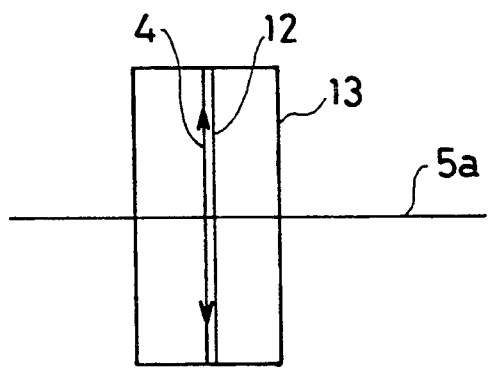
FIGS. 8A and 8B are diagrams for explaining the collimator (reticle) used in the embodiments of the present invention.
Figure 8B:
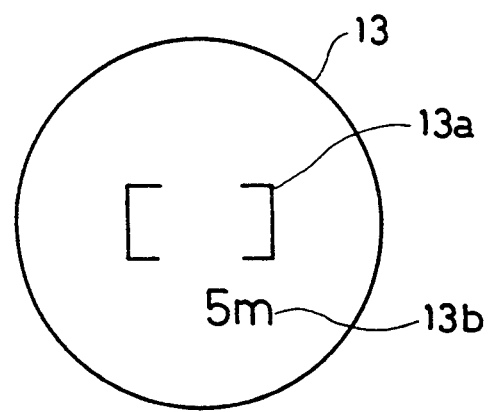

Also, as shown in FIG. 8A, arranged at the focal surface (the erect image 4) of the object lens 1 is a collimator (reticle) 13 having inserted therein an indicating device 12 such as a liquid crystal device or electrochromic device (designated at numeral 5a is the optical axis of the observation optical system) and in this way it is possible to indicate a region 13a where the focusing is taking place or a distance 13b to the target object as shown in FIG. 8B.

From the foregoing it will be seen that in accordance with the present invention the auxiliary prism having its exit surface formed perpendicular to the optical axis is connected to the semitransparent surface formed on the erect prism system so that there is no danger of the light ray being refracted unsymmetrically with respect to the optical axis during its transmission through the semitransparent surface and the problem of astigmatism can be overcome in both of the observation system and the focal point detecting system. Thus, by using the automatic focusing telescope of the present invention, it is possible to observe the extremely sharp image of a target object. The invention is not limited to the above-described embodiments and various modifications can be made to these embodiments within the technical scope defined by the appended claims.

What is claimed is:

1. An automatic focusing telescope comprising:
   object lens means for converging a light ray from an object to form an image of said object;
   ocular lens means for observing said image formed by said object lens means;
   erect prism means having a plurality of reflective surfaces and arranged between said object lens means and the image of said object to erect said image;
   semitransparent surface means formed on one of the plurality of reflective surfaces of said erect prism means to branch the light ray from said object lens means into a transmitted light path and a reflected light path;
   auxiliary prism means arranged on said transmitted light path from said semitransparent surface means and having an exit surface perpendicular to said transmitted light path;
   focal point detecting means for receiving the image of said object in one of said light paths branched from said semitransparent surface means to detect a focal point thereof; and
   drive means responsive to a signal from said focal point detecting means for moving at least one of said object lens means and said ocular lens means to adjust said focal point.

2. An automatic focusing telescope according to claim 1, wherein said focal point detecting means is arranged on the path of said light ray transmitted through said semitransparent surface means and said auxiliary prism means.

3. An automatic focusing telescope according to claim 1, wherein said semitransparent surface means is formed on last one of the plurality of reflective surfaces of said erect prism means.

4. An automatic focusing telescope according to claim 2, wherein said erect prism means is substantially the same in refractive index with said auxiliary prism means.

5. Automatic focusing binoculars comprising:
   a pair of right and left telescope optical systems, each of said telescope optical systems including object lens means for converging a light ray from an object to form an image of said object, ocular lens means for observing the image formed by said object lens means, and erect prism means having a plurality of reflective surfaces and arranged between said object lens means and the image of said object to erect said image;
   semitransparent surface means formed on one of the plurality of reflective surfaces of said erect prism means in one of said pair of telescope optical systems to branch the light ray from said object lens means into a transmitted light path and a reflected light path;
   auxiliary prism means arranged on said transmitted light path from said semitransparent surface means and having an exit surface perpendicular to said transmitted light path;
   focal point detecting means for receiving the image of said object formed in one of said light paths branched by said semitransparent surface means to detect a focal point thereof; and
   drive means responsive to a signal from said focal point detecting means to move at least one of said object lens means and said ocular lens means of said one telescope optical means to adjust said focal point.

6. Automatic focusing binoculars according to claim 5, wherein said focal point detecting means is arranged on the path of the light ray transmitted through said semitransparent surface means and said auxiliary prism means.

7. Automatic focusing binoculars according to claim 6, further comprising reflecting means for reflecting the light ray transmitted through said auxiliary prism means at a right angle, and wherein said focal point detecting means receives the reflected light from said reflecting means.

8. Automatic focusing binoculars according to claim 6, further comprising reflecting means for reflecting the light ray transmitted through said auxiliary prism means toward said object lens means, and wherein said focal point detecting means receives the reflected light from said reflecting means.

* * * * *